US006657647B1

(12) United States Patent
Bright

(10) Patent No.: US 6,657,647 B1
(45) Date of Patent: Dec. 2, 2003

(54) CONTROLLING THE ORDER IN WHICH CONTENT IS DISPLAYED IN A BROWSER

(75) Inventor: Walter G. Bright, Kirkland, WA (US)

(73) Assignee: Xoucin, Inc., Kirkland, WA (US)

( * ) Notice: Subject to any disclaimer, the term of this patent is extended or adjusted under 35 U.S.C. 154(b) by 468 days.

(21) Appl. No.: 09/670,226

(22) Filed: Sep. 25, 2000

(51) Int. Cl.[7] .................................................. G06F 3/00
(52) U.S. Cl. ........................ 345/856; 345/862; 345/157; 345/760
(58) Field of Search ................................. 345/760, 764, 345/856, 862, 157, 160, 859, 619; 715/513, 514, 515

(56) References Cited

U.S. PATENT DOCUMENTS

| 6,018,345 | A | * | 1/2000 | Berstis ........................ 345/859 |
| 6,078,935 | A | * | 6/2000 | Nielsen ........................ 715/513 |
| 6,118,449 | A | * | 9/2000 | Rosen et al. ................ 345/861 |
| 6,226,642 | B1 | * | 5/2001 | Beranek et al. ............... 707/10 |
| 6,252,579 | B1 | * | 6/2001 | Rosenberg et al. .......... 345/856 |
| 6,356,283 | B1 | * | 3/2002 | Guedalia ...................... 345/760 |
| 6,393,407 | B1 | * | 5/2002 | Middleton, III et al. ...... 705/14 |

* cited by examiner

*Primary Examiner*—John Cabeca
*Assistant Examiner*—Kieu D. Vu
(74) *Attorney, Agent, or Firm*—Schwabe, Williamson & Wyatt, PC

(57) ABSTRACT

A main document and referenced frame documents to be rendered by a browser for a display page are parsed by the browser to identify where text and graphics objected are to be located. The location of a cursor that is used by the user to interact with the browser is tracked, and the object nearest to the cursor is determined. This object is then rendered prior to the rendering of other objects in the display page that would normally be rendered prior to the nearest object under conventional rendering schemes. Optionally, objects related to the nearest objects may be rendered the same time, and various other objects may be rendered or partially rendered while data corresponding to the nearest object is being received by the browser.

22 Claims, 7 Drawing Sheets

CONTROLLING THE ORDER IN WHICH CONTENT IS DISPLAYED IN A BROWSER

BACKGROUND OF THE INVENTION

1. Field of the Invention

The present invention is related to the field of data processing. More specifically, the present invention is related to the rendering of display data.

2. Background Information

With advances in integrated circuit, microprocessor, networking and communication technologies, increasing number of devices, in particular, digital computing devices, are being networked together (wirelessly or via wire lines). As a result of this trend of increased connectivity, increasing number of client/server based and network dependent applications are being deployed. Examples of these client/server based and network dependent applications include but are not limited to, email, net based telephony, world wide web and various types of e-commerce.

Among the client/server based and network dependent applications, thin-client architecture, also known as web-client architecture, perhaps because of its "ease of implementation" on the client side, is especially popular. Typically, the architecture merely involves a "user-agent", such as a Web browser or a WAP (Wireless Access Protocol) Browser, on the client side. There is no need for the client to have any application specific programs installed. Application specific logic are run on the server side, and the client just has to run the browser to render the content to displayed at a particular point in time (provided by the server or servers). Each collection instance of these content is often referred as a "page" or a "web page". Typically, the browser retrieves for each page, a set of descriptions specifying the content to be displayed and their layout, and then the content themselves from the server or other servers. The descriptions are typically authored in a browser specific language, such as HTML (Hypertext Markup Language) for Web browser, HDML/WML (Handheld Device Markup Language or Wireless Markup Language) for WAP browser. The browser then renders the content on a display screen as specified by the retrieved descriptions, in the order the contents are received.

Often time, a user may be interested in only a portion of the page, e.g. in a log-in home page, where the user is just interested in getting the log-in "box" rendered, so the user can start the log-in process, or a user is interested in only a particular summary section of a customized home page (such as a stock summary section, a headline section, a sport section or a weather section, where the user can quickly take a look at the latest information on whatever the subject of interest may be (e.g. latest stock prices for a short list of stocks, latest headlines, latest sport scores, latest weather and so forth).

Under prior art browsers, a user has no control over the order in which the various sections of a page is displayed. If the section or sections of most interest happen to be displayed last or near last, that's just tough luck for the user. Thus, under the prior art, users are often frustrated, in waiting for the section or sections of interest to be displayed.

Accordingly, a more user friendly approach to rendering display content is desired.

SUMMARY OF THE INVENTION

The present invention addresses the foregoing desires by providing a method and system that enables users to control the order in which objects are rendered on a display page. In accord with the method, a main HTML document corresponding to the display page is requested from a network server, such as an Internet web server, and the web server initiates sending of the document to a client comprising a browser running on a computer the user is operating. The main document comprises markup language code, such as HTML, which is used to define the layout of internal text objects included in the document and external text and graphic objects referenced by the document. For instance, the document may contain references to separately stored graphic images; in such instances, files corresponding to these graphic images will be sent by the network server to the browser, or the network server will request that the files be sent from another server from which they are served to the browser.

Upon receiving the main document, the browser parses the document to identify the locations of where the text and graphic objects that make up the display page are to be located when the page is rendered. As the page begins to be rendered, the location of the cursor on the display page is identified, and it is compared with the locations of the text and graphic objects to determine which object is nearest the cursor. That object is then rendered prior to other objects on the display page, thereby enabling the user to control the order in which the objects are rendered. Preferably, the method also includes rendering placeholders corresponding to where respective objects are to appear on the display page so that the user can better select the object(s) the user desires to have rendered prior to the rendering of other objects. In addition, related objects may be rendered along with the selected (i.e., nearest to the cursor) object, which is especially beneficial when a user desires to access multiple user-input objects, such as logins requiring a user name and password or access code.

The method further enables users to selectively control whether a page is rendered using a conventional rendering scheme or using the foregoing user-controlled rendering scheme through the use of a program setting (e.g., a menu option) and/or a user interaction, such as a double click. For example, if a user double-clicks a display area or a placeholder prior to having an underlying object rendered, this would tell the browser to render the object(s) corresponding to this display area or placeholder prior to rendering other objects. In addition, the method provides for rendering of other objects while data corresponding to the selected object are being received by the browser to enhance the rendering speed of the display page. Additional aspects of the invention include a system and article of manufacture for implementing the foregoing method.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

Figure 1:
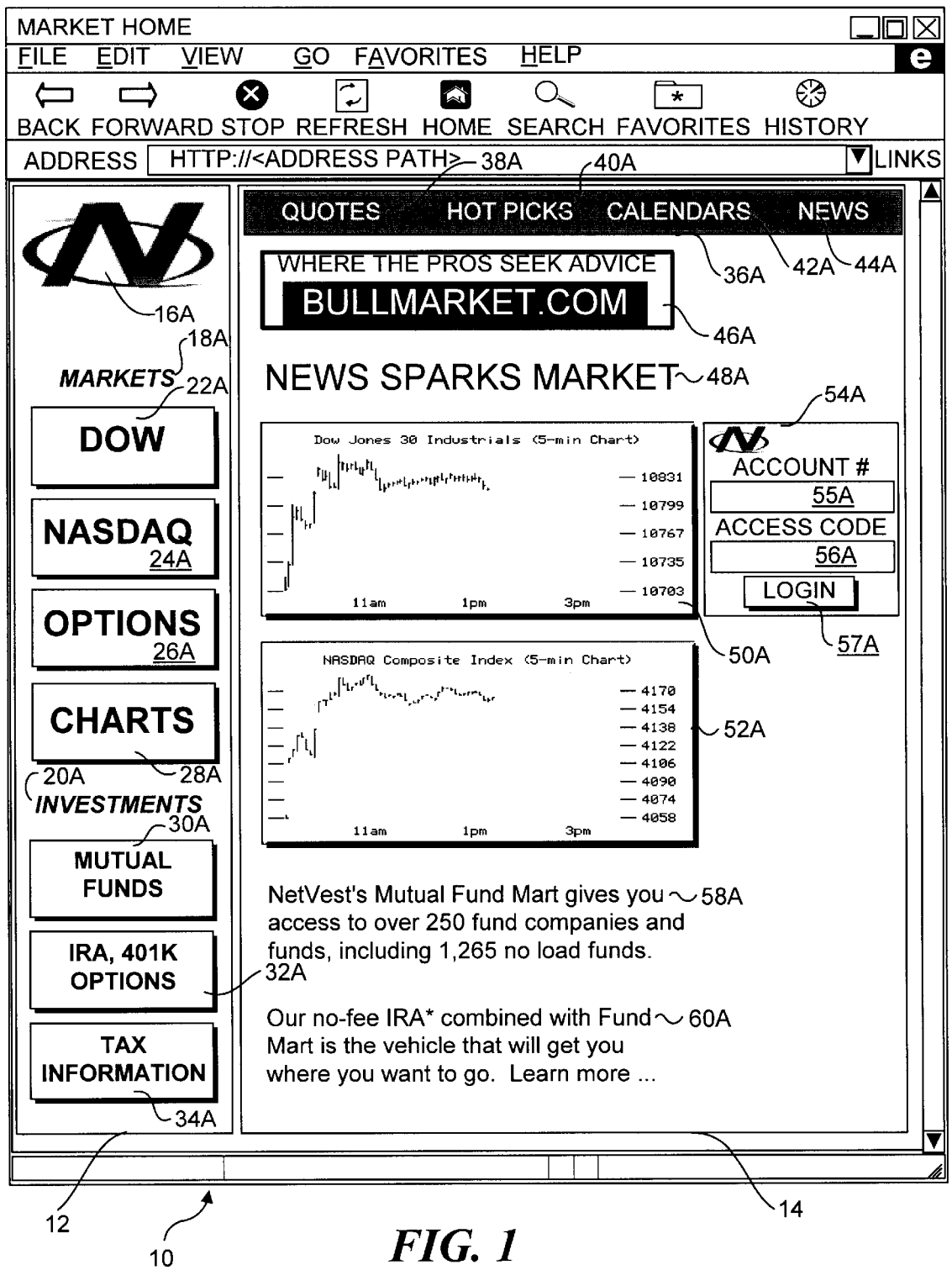
FIG. 1 is a representation of an exemplary web page comprising text and graphic objects as it would appear on a display screen when rendered by a modern Internet browser.

FIG. 1 shows a representation of a web page 10 served from an exemplary stock brokerage Internet web site as it would appear when rendered on a modern Internet browser, such as Microsoft's Internet Explorer or Netscape's Navigator. Web page 10 is exemplary of many web pages that implement frames, and includes two adjacent frames 12 and 14. A logo graphic object 16A is displayed at the top of frame 12, which additionally includes a "MARKETS" text header 18A, an "INVESTMENTS" text header 20A, and a plurality of links with overlaying graphic objects, including a "DOW" link 22A, a "NASDAQ" link 24A, an "OPTIONS" link 26A, a "CHARTS" link 28A, a "MUTUAL FUNDS" link 30A, a "IRA, 401K OPTIONS" link 32A, and a "TAX INFORMATION" link 34.

A horizontal group of links 36 is disposed at the top of frame 14, and includes a "QUOTES" link 38A, a "HOT PICKS" link 40A, a "CALENDARS" link 42A, and a "NEWS" link 44A. An advertisement banner 46A is displayed just below the horizontal group of links and just above a "NEWS SPARKS MARKET" headline 48A. Frame 14 also includes a pair of graphic objects, including a DOW chart 50A and a NASDAQ chart 52A. A set of user input objects is disposed adjacent to DOW chart 50A within a graphic object 54A, including an "ACCOUNT #" input box 55A, an "ACCESS CODE" input box 56A, and a "LOGIN" button 57A. In addition to the foregoing objects, frame 14 also includes text objects 58A and 60A.

Figure 2:
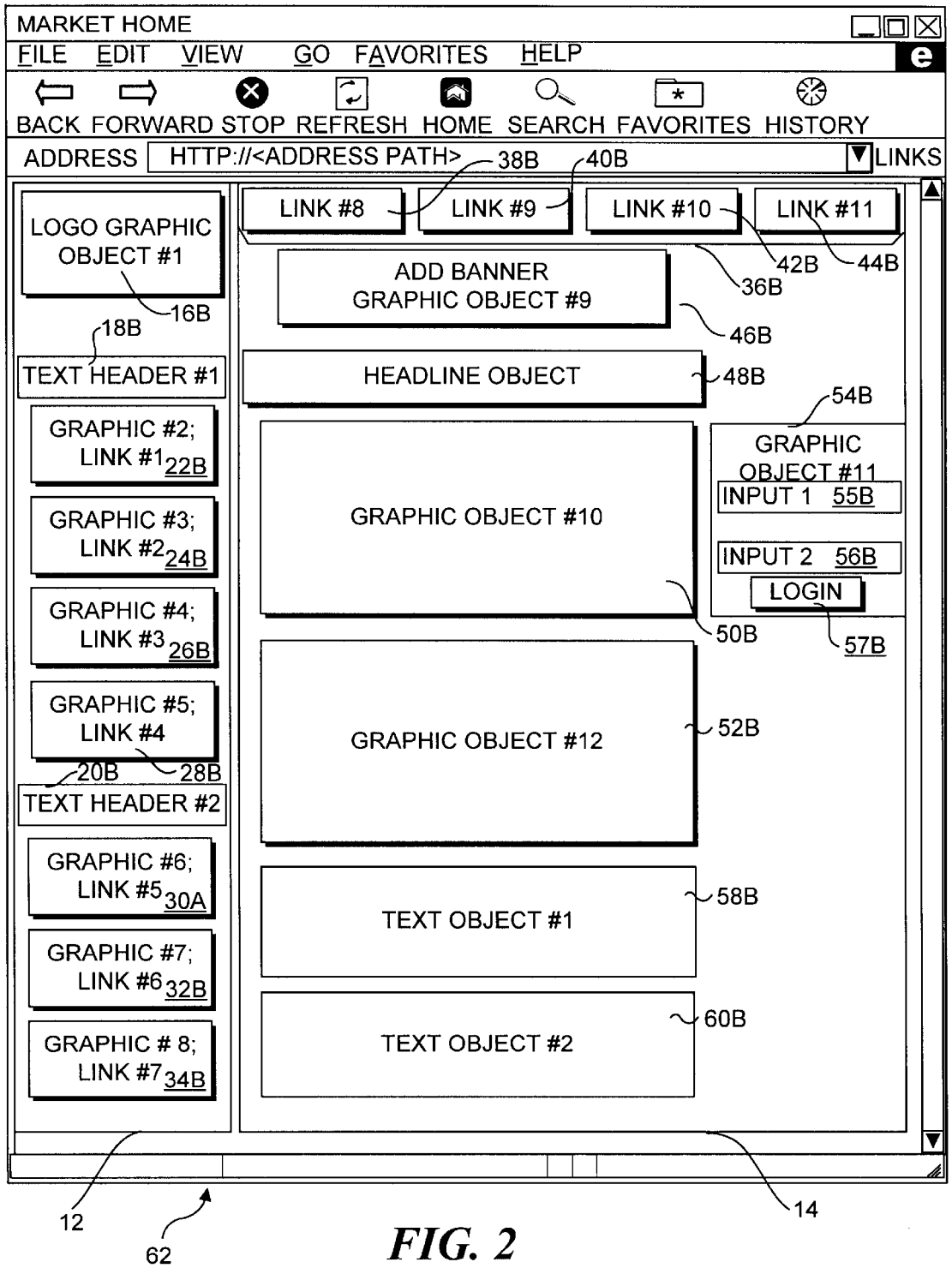
FIG. 2 shows the location and size of the text and graphic objects of the web page of FIG. 1.

With reference to FIG. 2, an object model representation 62 of web page 10 is depicted, wherein each of the various graphic, link, header, and text objects in FIG. 1 have been replaced with a corresponding logical object having the same base reference number with an appended "B." For example, logo graphic object 16A has been replaced with a logical object labeled "LOGO GRAPHIC OBJECT #1" with a reference number of 16B.

An HTML listing corresponding to web page 10 is presented below as LISTING 1. Note that LISTING 1 sometimes refers to object descriptions and link paths rather than the text or path location of actual objects for simplicity, and that other elements commonly found in HTML pages, such as META entries, are omitted for clarity.

LISTING 1

```
1.  <html>
2.  <head><title>"MARKET HOME"</title></head>
3.
4.  <body bgcolor="#FFFFFF" link="0033CC" vlink="0033CC">
5.
6.  <frameset cols="25%,75% frameborder=0 border=0>
7.  <frame>
8.  <align=left><align=top>
9.  <img src="/directory path/logo.gif" align = left border="0" height="80" width="100">
10. <br><br>
11. <t3>TEXT HEADER #1 align=left</t3><br>
12.
13. <table width="90%" border=0 cellspacing=10 cellpadding=0 bgcolor="#000000"
14. align=center>
15.     <tr>
16.         <a href="URL or path for LINK #5" <img src="/directory
17.         path/GRAPHIC#2" height="[001b]50" width ="150></a>
18.     <tr>
19.         <a href="URL or path for LINK #6" <img src="/directory
20.         path/GRAPHIC#3" height="50" width ="150></a>
21.     <tr>
22.         <a href="URL or path for LINK #7" <img src="/directory
23.         path/GRAPHIC#4" height="50" width ="150></a>
24.     <tr>
25.         <a href="URL or path for LINK #8" <img src="/directory
26.         path/GRAPHIC#5" height="50" width ="150></a>
27. </table>
28.     <br>
29.         <t3>TEXT HEADER #1 align=left</t3>
30.     <br>
31. <table width="90%" border=0 cellspacing=10 cellpadding=0 bgcolor="#000000"
32. align=center>
33.     <tr>
34.         <a href="URL or path for LINK #9" <img src="/directory
35.         path/GRAPHIC#6" height="50" width ="150></a>
36.     <tr>
37.         <a href="URL or path for LINK #10" <img src="/directory
38.         path/GRAPHIC#7" height="50" width ="150></a>
39.     <tr>
40.         <a href="URL or path for LINK #11" <img src="/directory
41.         path/GRAPHIC#8" height="50" width ="150></a>
42.
43. </table>
44. </frame>
45.
```

LISTING 1 (-continued)

```
46.    <frame>
47.
48.    <table>
49.        <tr>
50.            <table width="100%" border=0 cellspacing=15 cellpadding=0
51.            bgcolor="#000000" align=center>
52.        <tr>
53.            <td><a href="URL or path for link#1">alt="QUOTES"</a>
54.            <td><a href="URL or path for link#2">alt="HOT PlCKS"</a>
55.            <td><a href="URL or path for link#3">alt="CALENDERS"</a>
56.            <td><a href="URL or path for link#4">alt="NEWS"</a>
57.    </table><br>
58.        <br>
59.            <img src="URL for GRAPHIC #9" align=center
60.            border="0" height="80" width="325">
61.        <br><t1>HEADLINE TEXT>/t1>
62.        <table>
63.            <Colgroup span="2">
64.                <Col width = "400" align="center">
65.                <Col width = "200" align="center">
66.                <tr><td>
67.                    <img src="/directory path/GRAPHIC #10" align = center
68.                    border="0" height="200" width ="350">
69.                <td>
70.    /* INPUT FOR ACCOUNT NUMBER AND ACCESS CODE    */
71.    <SCRIPT LANGUAGE ="Javascript">
72.    <!---
73.            [Javascript variable declarations]
74.            [Javascript functions to enable login] ---!>
75.    </SCRIPT>
76.        <table>
77.          <td>
78.          <img src="/directory path/GRAPHIC #11" align = center
79.          <table width="150" height="25">
80.          <td>
81.          <font size=-2 face="arial,helvetica,verdana">Account #</font>
82.          <tr><input type=text name="USERID" maxlength=9 size=20>
83.          <tr><font size=-2 face="arial, helvetica">Access Code: </font>
84.        <tr><input type=password name="PASSWORD" maxlength=10 size=20
85.          onKeyDown="SuppressEnterBell(event)"
86.          onKeyPress="SuppressEnterBell(event)"
87.          onKeyUp="SubmitOnEnter(event)">
88.          <br> 
89.          <br><input type="button" value="Login"
90.          OnClick="ProcessForm( )">  <input type="reset">
91.          <br> 
92.          </td>
93.          </table>
94.        </table>
95.    <tr>
96.            <img src="/directory path/GRAPHIC #12" border="0
97.            height="200" width="350">
98.    <tr>
99.                <p>TEXT FOR TEXT OBJECT #1</p><br>
100.               <p>TEXT FOR TEXT OBJECT #2</p>
101.       </table>
102.    </frame>
103. </frameset>
104. </html>
```

Web page documents comprise HTML code that is parsed, interpreted, and rendered by a browser. An HTML document comprises a plurality of HTML "markup" elements (tags) with corresponding attributes, that are used to describe the layout and formatting of various objects, including plain text and graphic objects, embedded between tag pairs. Exemplary elements include text tags (e.g., <b></b> for bolding text), links (e.g., <a href="URL"></a>), formatting (e.g., <p></p> for creating a new paragraph, graphical (e.g., img src="name">), wherein "name" defines an absolute or relative location at where an image is stored, tables (e.g., <table></table> creates a table, and forms (e.g., <form></form> creates all forms).

As of Netscape Navigator 3.0 (and other later browsers), web pages could include frames. When using frames, the display page is divided into multiple framed areas. Framing enables a single display page to include source code from several HTML documents (one for each frame) or optionally, enables a single document to include more complicated grouping of contents whereby different content groups are contained in separate frames. Frames are commonly found on the web pages at sites that display a great deal of text and graphical content, such as MSN.com, ESPN.com, and USAToday.com.

Display of a web page on a monitor involves the work of both a client (the web browser and the computer it runs on)

and a server (the web server). The client and web server work in tandem to produce the desired display page, in the following manner. First, a request for a web page is made by the browser to the network server from which the web page is served through use of a Uniform Resource Locator (URL). The requested page, in the form of a main HTML document sent in one or more packets, is then transmitted over a network (e.g., the Internet) from the server to the computer on which the browser is running using the Hypertext transport protocol (HTTP). If only a single document is referenced in the HTML, this document will contain the HTML of the web page. If the page comprises frames based on separate HTML files, then these files will be identified by the server, and requested to be sent from the server (or other servers) to the browser. In addition, if the HTML includes tags identifying graphic image files, sound files and/or video files, the server will request that these files be sent to the browser as well. As the different objects of the page arrive at the client, they are stored in a cache, a combination staging area and storage area. Meanwhile, the browser begins using the elements in the cache to reassemble the Web page on screen, following the HTML codes in the main document to determine where to place the text, graphic, and video objects on the display page. Since all portions of the page do not arrive at the client computer at the same time, different parts of the page are rendered before others. Text, which typically comprises the primary non-tag content in the main HTML document and frame documents, is usually rendered first, followed by still and animated graphics, sounds and music, and then videos. In addition, further processing is necessary for many objects once they arrive at the client computer, such as decompressing the graphic, sound, and video files.

As discussed above, when the browser receives the HTML corresponding to the main document (and frame documents, if appropriate) a pre-rendering parsing of the HTML is performed to determine where to place the various objects on the display page. For example, elements such as tables, column definition, graphic images, paragraphs and line breaks are identified. If frames are included, each frame is examined in the sequential order it appears in the HTML document, or the order in which the HTML documents corresponding to the frames in a frameset are downloaded to the browser. During further processing, the actual objects are rendered in their respective positions. Some of these objects are rendered almost immediately, such as plain text, while other objects, such as graphic objects, must first be retrieved prior to being fully-rendered. With respect to tables, there are some instances in which the all of the objects corresponding to the cells in the table must be retrieved prior to rendering any of the table, while a well-designed table can be rendered incrementally. For example, by using Column grouping, the format of the corresponding table can be quickly determined by the browser.

While text objects are generally rendered very quickly, the rendering of graphic objects is generally much more time consuming. This is true for several reasons: the size of graphic objects (in terms of binary data) is many times greater than text that occupies the same area; many graphic images are stored in compressed formats (e.g., JPEG), and must be decompressed before they can be displayed; and graphic images are sent to the client separately from the HTML content of the page. In order to accommodate this, browsers typically rendering other portions of a page while the graphic images are being received from the web server and/or other servers on which the graphic image files are served from. With more advanced browsers, such as Netscape Navigator 3.0 or later and Microsoft Internet Explorer 4.0 and later, the approximate screen area where graphic elements are to be displayed are indicated with outlined "placeholder" boxes, and the graphical content of the images corresponding to each outline box is rendered when the content has been retrieved by the browser.

With reference to FIG. 2, there are twelve graphic images that must be retrieved prior to completing rendering of web page 10. In HTML, objects comprising graphic content are identified by the browser when it parses an <img scr="/local directory path/graphic image file" (for a local graphic image) or "URL" (for a remote graphic image)> tag. In the foregoing tag, local graphic images are typically stored on the same server as the web page, or another computer that is local to the site's server, and generally are located through a local directory path (absolute or relative to the location of the present page) that points to the graphic image file. Remote images are those images that are stored on servers at sites that are remote to the web server. For example, with reference to LISTING 1, when the parser encounters line 9, the browser identifies that data comprising a graphic image corresponding to logo graphic object 16 will be arriving, and the displayed image is to have a height of 80 pixels and a width of 100 pixels. The location of each object on a display page will be dependent on previous HTML layout elements, such as tables, paragraphs, line breaks, and other graphic objects. The size and location of the other graphic objects (i.e., graphic objects #2–12) on the page are determined in a similar manner. The HTML code for these objects are shown in lines 16, 19, 22, 25, 34, 37, 40, 59, 67, 78 and 96, respectively. As identified in the HTML code, data corresponding to graphic objects #9 (advertisement banner 46A) is forwarded to the browser from an external site (as indicated by the URL to GRAPHIC #9), while graphic objects 1–8 and 10–12 are sent from the web site the main HTML document is sent from.

Figure 3:
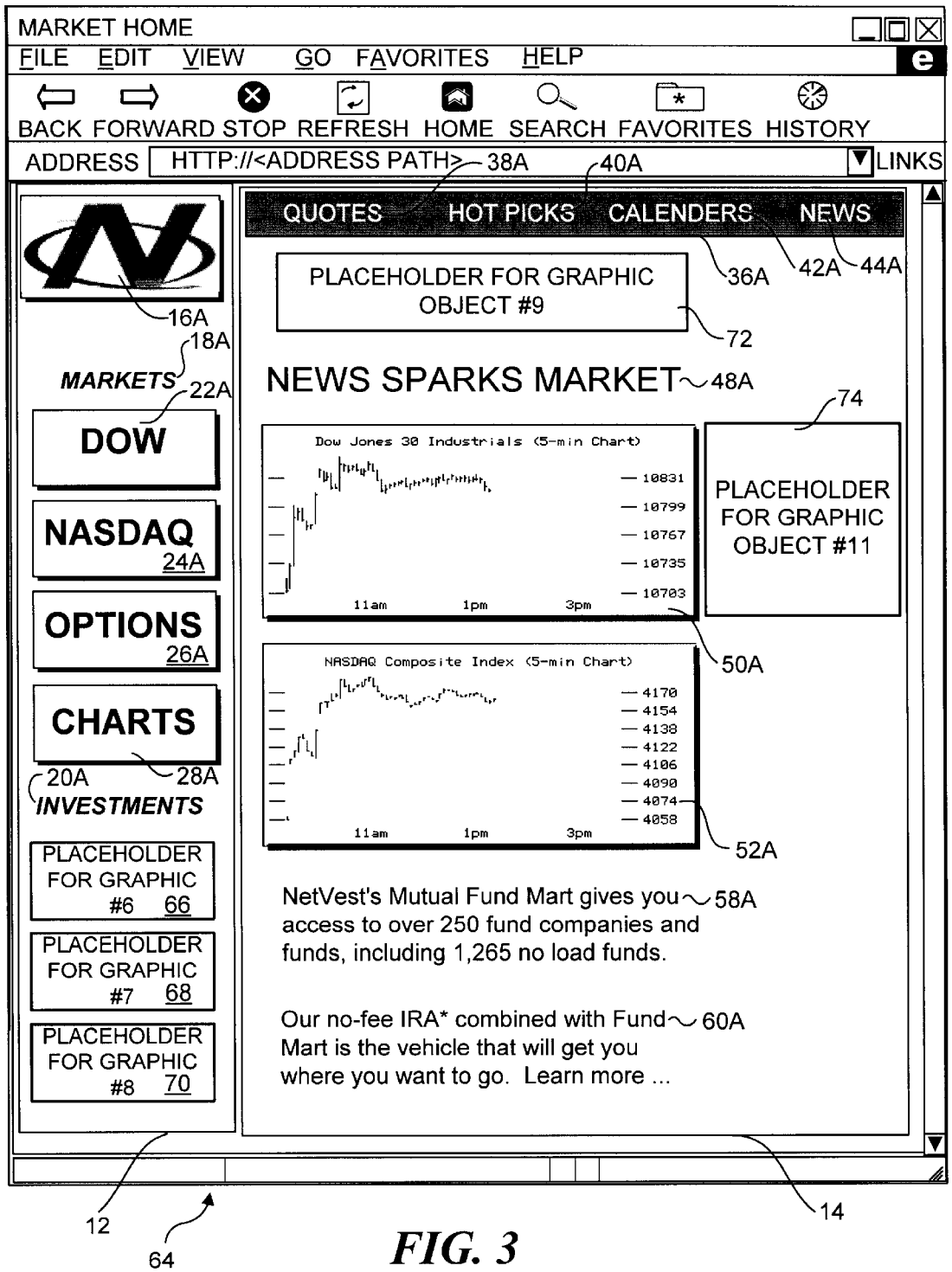
FIG. 3 is a representation of the web page of FIG. 1 after it has been partially rendered.

A partially-rendered web page 64 corresponding to web page 10 and the foregoing conditions is shown in FIG. 3. All of the text objects in both frames 12 and 14 are rendered, while most of the graphic objects in the frames are rendered. In addition, note that most of the locally-stored graphic objects (those having a "/directory path/GRAPHIC #X)" are fully-rendered, while the remotely stored graphic object is not fully rendered, since this object must first be requested by the web server to a remote server before the remote server will send it to the browser.

As discussed above, after the browser has identified where various graphic objects are to be placed, placeholders comprising boxes that approximately cover the areas in which corresponding graphic images are to be rendered are displayed on the page prior to the rendering of such graphic images. In FIG. 3, these placeholders include a placeholder 66 for graphic object #6, a placeholder 68 for graphic object#7, a placeholder 70 for graphic object #8, a placeholder 72 for graphic object #9, and a placeholder 72 for graphic object #11.

Suppose that web page 10 is the home page for an online stock brokerage site, and it is the first page users of the brokerage site see when they link to the Internet site. Many users might want to request that a trade be made, which would requiring logging into the site first. However, under the foregoing conventional rendering scheme, the users would have to wait until the login objects (i.e., "ACCOUNT #" input box 55A, "ACCESS CODE" input box 56A, and "LOGIN" button 57A) are rendered before they could login to the web site. This would be very frustrating to many users.

Figure 4A:
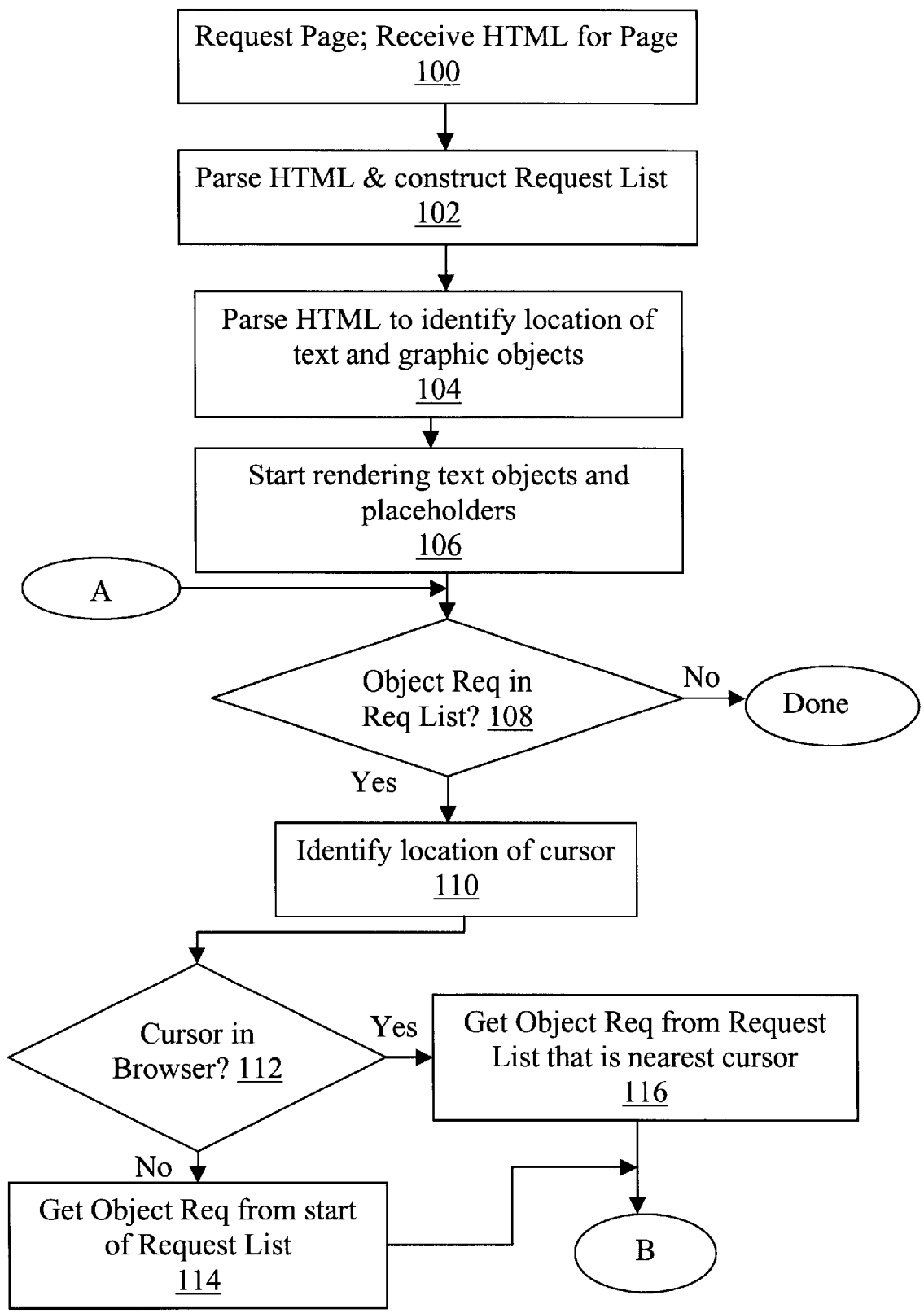
FIGS. 4a–4b illustrates the relevant logic used by the present invention when rendering a display page.
Figure 4B:
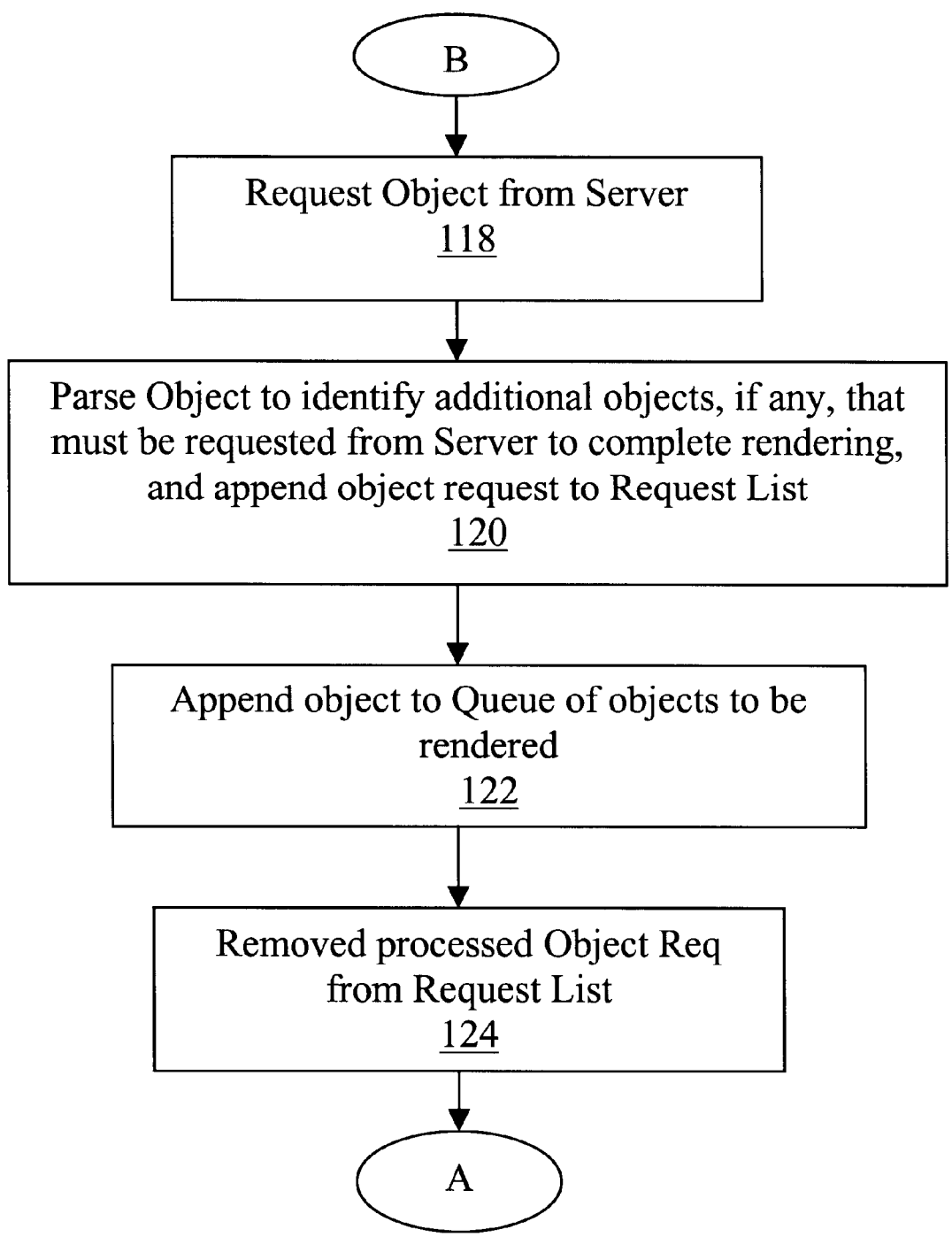
Figure 5:
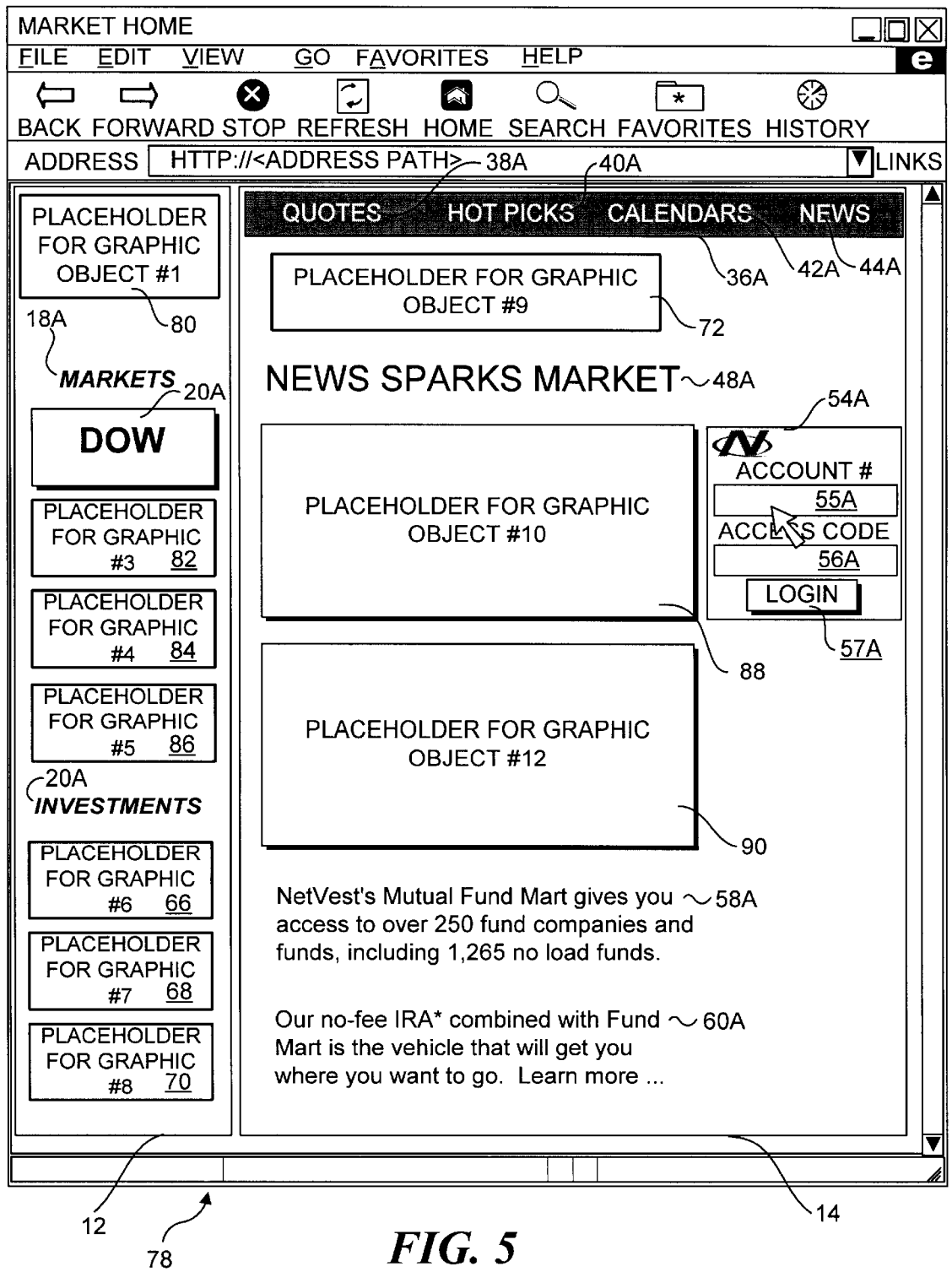
FIG. 5 is a representation of the web page of FIG. 1 after a partial rendering when using the user-controlled rendering scheme of the present invention.

This type of problem is addressed by the present invention, which enables the order in which display page objects are rendered based on where the browser user places the cursor on the display page in the following manner. With reference to the flowchart of FIGS. 4a–4b, the process begins in a block 100 in which a page request to a web server is made, and the HTML corresponding to the page is received by the browser. Typically, data corresponding to various graphic images in the page and other non-text objects, such as sound and video files, are also begins to be received by the browser. As discussed above, in conjunction with sending the main HTML document, the web server will send HTML documents corresponding to the frames within the page (if such frames are referenced to separate documents in the main HTML document) and will begin sending and/or make request to other servers to send the objects referenced in the HTML that are stored separate from the main HTML document and the frame documents, if applicable.

As the main document is received by the browser, it is parsed to identify a list of objects that must be requested from the server or other servers in order to complete render the page, block 102. The identity of the identified objects and the locations from which the identified objects are to be requested are placed onto a "request list". The "request list" is implemented as a data structure in memory. The data structure may be constructed using any one of a number of data organization techniques known in the art. The browser also identifies the location of the various text and graphic objects are to be when the page is rendered, in accord with a block 104. This step comprises building a virtual layout of the page in memory, such as that shown in FIG. 2, whereby the areas to be occupied by the various text and graphic objects in the rendered page are identified. The layout of the page is primarily determined by the frame definitions (if any), table definitions, image source definitions, paragraph boundaries, line breaks, and other formatting attributes, such as alignment attributes. After the layout is identified, in a block 106 the browser begins rendering a portion of the text objects on the display page and renders placeholders corresponding to where graphic objects are to be located on the display page. [In one embodiment, objects ready to be rendered, such as the initially received text objects and placeholders are placed on a queue. Similarly, the queue is placed in memory.]

In browsers that run under Microsoft WINDOWS™ operating systems (e.g., WINDOWS™ 95, 98, 2000 and NT), the display page is maintained as a virtual page with a resolution much higher than the final resolution of the display page. In this manner, a single page layout description can be mapped to various client computer display resolutions. For example, the virtual page resolution might be 20,000×20,000 units, which is mapped to display resolutions of 640×480 pixels, 1024×768 pixels or 1280×1024 pixels, etc.

While the page begins to be rendered, in a block 108, the browser determines if there are object requests to be made. If there are object requests in the request list to be processed, the browser determines the current location of the cursor on the display, block 110, and in particular, whether it is within the browser display window, block 112. Under WINDOWS™ operating systems, the position of the cursor is internally tracked by the operating system, and API (application program interface) calls are provided to enable application programs to obtain such information from the operating system. As discussed above, the operating system maintains a virtual page layout description through which a single layout description can be mapped to a variety of different display resolutions. The position of the mouse cursor is tracked using this same virtual page layout.

If the cursor is outside the browser's display window, the browser would simply obtain the "next" object request to be processed at the "top" or "start" of the request list, block 114. On the other hand, if the cursor is within the browser's display window, the browser would identify the object nearest to the current location of the cursor, yet to be rendered, and obtain the corresponding object request from the request list to process instead, block 116. [Note that by recursively checking for the current location of the cursor for as long as there are object requests to be processed, the present invention allows for the movement of the cursor while a page is being rendered.]

The task of identifying an object nearest to the current location of a cursor is normally performed by typical browser and is well known in the art. For example, when a user clicks on an object with an underlying link on the display page (such as a text hyperlink or a graphic with an underlying hyperlink), the browser knows what link to activate based on the location of the link on the virtual page and the location of the mouse when it is clicked on the virtual page.

Whether it is the "next" object request or an object request corresponding to an object closest to the current location of the cursor is obtained from the request list for processing, the browser continues its processing at block 118, wherein the browser requests a server for the object. Upon receipt of the object, the browser parses the object to determine whether further objects are to be requested, block 120. If there are, the browser appends additional requests into the request list for subsequent processing, block 120.

Thereafter, the browser inserts the received object in the queue for rendering in due course, 122. In one embodiment, if the object is received as a result of obtaining an object request corresponding to an object that is nearest to the current location of a cursor, the browser inserts the received object at the "head" of the queue to cause the received object to be rendered first. On the other hand, if the object is received merely as a result of obtaining the object request from the "top" of the request list, the browser appends the received object to the "end" of the queue to cause the received object to be rendered first. Further, the browser removes the processed object request from the request list, block 124.

It is noted that the foregoing description of an exemplary implementation of the present invention for browsers that run under WINDOWS™ operating systems is not meant to be limiting, as the present invention is applicable to other operating systems as well, including UNIX and APPLE™ operating systems.

It is preferable that users be able to tell the browsers they are using to activate and deactivate the reordering of the rendering of objects provided by the present invention. In accord With one approach, the browser should include a menu option for activating and deactivating the feature. Furthermore, it may be preferable to have the feature activated on a more selected basis, such as enabling the user to activate the feature on the fly. For instance, the user may activate the feature by double-clicking a right mouse button, whereby the rendering of a display page proceeds in its normal mode until such a user action is detected, whereupon, the method of the present invention is initiated to render the object nearest the mouse at the time the user action occurred. Other user actions, such as activating a key on a keyboard, could also initiate the method.

An exemplary rendered page 76 corresponding to web page 10 illustrates how the user-controlled ordering of the rendering of objects on a display page provided by the present invention would enable the stock brokerage site user to login without having to wait for most of the other objects on the page to be rendered. Suppose the user places a cursor 78 over "ACCOUNT#" input box 55A. In accord with the foregoing discussion, "ACCOUNT#" input box 55A will be the object closest to cursor 78, and therefore will be rendered first. (As discussed above, other objects that do not require data from outside the main HTML document (e.g., text objects 18A, 20A, 48A, 58A and 60A) preferably will be rendered at the same time "ACCOUNT#" input box 55A is loaded into the browser and rendered). Additionally, some graphic objects, such as "DOW" link 22A, may be rendered during this same time. Furthermore, since ACCOUNT# is contained within a local table definition, all of graphic object 54A, ACCESS CODE input box 56A, and LOGIN button 57A are logically related. Accordingly, these objects are rendered at approximately the same time as "ACCOUNT#" input box 55A.

As shown in exemplary display page 78, various objects that were rendered in display page 64 have been replaced with placeholders, including a placeholder 80 for graphic object #1(16B), a placeholder 82 for graphic object #3(24B), a placeholder 84 for graphic object #4(26B), a placeholder 88 for graphic object #10(50B), and a placeholder 90 for graphic object #12(52B). During subsequent rendering of display page 78, the placeholders will be replaced by their corresponding graphic objects when the data for such objects are received by the browser and reformatted for the display page.

Exemplary System for Implementing the Invention

Figure 6:
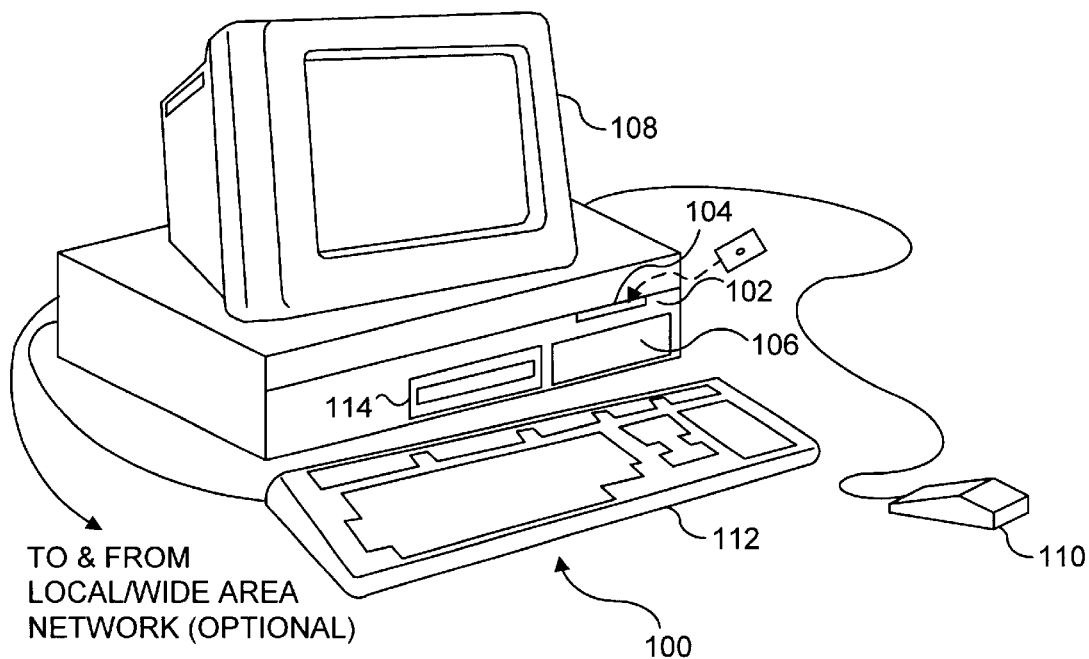
FIG. 6 illustrates an exemplary system for implementing the present invention.

With reference to FIG. 6, a generally conventional personal computer 100 is illustrated, which is suitable for use in connection with practicing the present invention. Alternatively, a corresponding workstation on a local area network may be used for executing machine instructions comprising a computer program that causes the present invention to be executed. Personal computer 100 includes a processor chassis 102 in which are mounted a floppy disk drive 104, a hard drive 106, a motherboard populated with appropriate integrated circuits (not shown), and a power supply (also not shown), as are generally well known to those of ordinary skill in the art. A monitor 108 is included for displaying graphics and text generated by software programs that are run by the personal computer, and for graphically representing models of objects produced by the present invention. A mouse 110 (or other pointing device) is connected to a serial port (or to a bus port) on the rear of processor chassis 102, and signals from mouse 110 are conveyed to the motherboard to control a cursor on the display and to select text, menu options, and graphic components displayed on monitor 108 by software programs executing on the personal computer, such as a browser that implements the present invention. In addition, a keyboard 112 is coupled to the motherboard for user entry of text and commands that affect the running of software programs executing on the personal computer.

Personal computer 100 also optionally includes a compact disk-read only memory (CD-ROM) drive 114 into which a CD-ROM disk may be inserted so that executable files and data on the disk can be read for transfer into the memory and/or into storage on hard drive 106 of personal computer 100. Other mass memory storage devices such as an optical recorded medium or DVD drive may be included. The machine instructions comprising the software program that causes the CPU to implement the functions of the present invention that have been discussed above will likely be distributed on floppy disks or CD-ROMs (or other memory media) and stored in the hard drive until loaded into random access memory (RAM) for execution by the CPU.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. For examples, the present invention specifically contemplates that the cursor location based manner of controlling the order of rendering display content may be practiced on a set-up box, a notebook sized portable computer, a palm sized personal digital assistant (PDA), or a wireless cell phone, having the appropriate browser or "user agent" installed thereon. Accordingly, it is not intended that the scope of the invention in any way be limited by the above description, but instead be determined entirely by reference to the claims that follow.

What is claimed is:

1. A method for controlling an order in which objects are rendered on a display page by a browser, comprising
  requesting a main document corresponding to the display page from a network server, said main document comprising code defining a layout of internal objects included in the main document and external objects referenced by the main document, said external objects including any frame documents referenced in the main document;
  parsing said code of the main document and any frame documents referenced by the main document to identify locations where said internal and external objects are to be rendered on the display page;
  identifying a location of a cursor relative to the display page;
  identifying an internal or external object nearest the location of the cursor;
  rendering the internal/external object that is identified to be nearest the cursor; and
  rendering other internal and external objects to complete rendering of the display page.

2. The method of claim 1, wherein the method further comprise facilitating a user to select whether internal and external objects in the display page are to be rendered using a conventional ordering scheme without considering the location of the cursor, or are to be rendered as defined in claim 1.

3. The method of claim 2, wherein the user is enabled to made said selection by a user-interaction with a pointing device that interacts with the browser.

4. The method of claim 1, further comprising rendering internal/external objects related to the internal/external object determined to be nearest the cursor prior to rendering other internal/external objects in the display page.

5. The method of claim 1, further comprising rendering a portion of the internal objects included in the main document and any frame documents referenced by the main document while data corresponding to the internal/external object determined to be nearest the cursor are being received by the browser from the network server or another network server.

6. The method of claim 1, further comprising:
  determining if the cursor has been moved, and that it is nearest an internal/external object that has yet to be rendered on the display page; and
  rendering the internal/external object nearest the cursor prior to rendering other internal/external objects if it is determined that the cursor has been moved.

7. The method of claim 1, further comprising rendering placeholders corresponding to where graphic internal/external objects are to be rendered on the display page prior to such graphic internal/external objects being rendered.

8. A system for controlling an order in which objects are rendered on a display page, comprising:
   a memory in which machine instructions comprising a browser computer program are stored;
   a processor coupled to the memory for executing the machine instructions;
   a display, coupled to the memory and processor; and
   said processor implementing a plurality of functions when executing the machine instructions, including:
      requesting a main document corresponding to the display page from a network server, said main document comprising code defining a layout of internal objects included in the main document and external objects referenced by the main document, said external objects including any frame documents referenced in the main documents;
      parsing said code of the main document and any frame documents referenced by the main document to identify locations where said internal and external objects are to be rendered on the display pages;
      identifying a location of a cursor relative to the display page;
      identifying an internal or external object nearest the location of the cursor;
      rendering the internal/external object that is identified to be nearest the cursor; and
      rendering other internal and external objects complete rendering of the display page.

9. The system of claim 8, wherein said execution of the machine instructions by the processor further implements the function of facilitating a user to select whether internal and external objects in the display page are to be rendered using a conventional ordering scheme without considering the location of the cursor, or are to be rendered as defined in claim 8.

10. The system of claim 9, wherein execution of the machine instructions by the processor further implements the function of enabling the user to made said selection by a user-interaction with a pointing device that interacts with the browser.

11. The system of claim 8, wherein execution of the machine instructions by the processor further implements the function of rendering internal/external objects related to the internal/external object determined to be nearest the cursor prior to rendering other internal/external objects in the display page.

12. The system of claim 8, wherein execution of the machine instructions by the processor further implements the function of rendering a portion of the internal objects included in the main document and any frame documents referenced by the main document while data corresponding to the internal/external object determined to be nearest the cursor are being received by the browser from the network server or another network server.

13. The system of claim 8, wherein execution of the machine instructions by the processor further implements the function of:
   determining if the cursor has been moved, and that it is nearest an internal/external object that has yet to be rendered on the display page; and
   rendering the internal/external object nearest the cursor prior to rendering other internal/external objects if it is determined that the cursor has been moved.

14. The system of claim 8, wherein execution of the machine instructions by the processor further implements the function of rendering placeholders corresponding to where graphic internal/external objects are to be rendered on the display page prior to such graphic internal/external objects being rendered.

15. The system of claim 8, wherein said system is a selected one of a desktop computer, a set top box, a notebook sized computer, a palm sized personal digital assistant, and a wireless cell phone.

16. An article of manufacture for controlling an order in which objects are rendered on a display page, comprising:
   a memory media adapted to be used with a computer;
   a plurality of machine instructions stored on the memory media, said machine instructions effecting a plurality of functions when executed by the computer, including:
      requesting a main document corresponding to the display page from a network server, said main document comprising code defining a layout of internal objects included in the main document and external objects referenced by the main document, said external objects including any frame documents referenced in the main documents;
      parsing said code of the main document and any frame documents referenced by the main document to identify locations where said internal and external objects are to be rendered on the display page;
      identifying a location of a cursor relative to the display page;
      identifying an internal or external object nearest the location of the cursor;
      rendering the internal/external object that is identified to be nearest the cursor; and
      rendering other internal and external objects to complete rendering of the display page.

17. The article of manufacture of claim 16, wherein said functions effectuated when executed by the computer further include the function of facilitating a user to select whether internal and external objects in the display page are to be rendered using a conventional ordering scheme without considering the location of the cursor, or are to be rendered as defined in claim 16.

18. The article of manufacture of claim 16, wherein said functions effectuated when executed by the computer further include the function of enabling the user to made said selection by a user-interaction with a pointing device that interacts with the browser.

19. The article of manufacture of claim 16, wherein said functions effectuated when executed by the computer further include the function of the function of rendering internal/external objects related to the internal/external object determined to be nearest the cursor prior to rendering other internal/external objects in the display page.

20. The article of manufacture of claim 16, wherein said functions effectuated when executed by the computer further include the function of the function of rendering a portion of the internal objects included in the main document and any frame documents referenced by the main document while data corresponding to the internal/external object determined to be nearest the cursor are being received by the browser from the network server or another network server.

21. The article of manufacture of claim 16, wherein said functions effectuated when executed by the computer further include the function of the function of:
   determining if the cursor has been moved, and that it is nearest an internal/external object that has yet to be rendered on the display page; and
   rendering the internal/external object nearest the cursor prior to rendering other internal/external objects if it is determined that the cursor has been moved.

22. The article of manufacture of claim 16, wherein said functions effectuated when executed by the computer further include the function of the function of rendering placeholders corresponding to where graphic internal/external objects are to be rendered on the display page prior to such graphic internal/external objects being rendered.

* * * * *